(12) United States Patent
Wideman et al.

(10) Patent No.: US 8,463,757 B2
(45) Date of Patent: Jun. 11, 2013

(54) FILE REPAIR

(76) Inventors: Roderick B. Wideman, Shakopee, MN (US); Don Doerner, San Jose, CA (US)

(*) Notice: Subject to any disclaimer, the term of this patent is extended or adjusted under 35 U.S.C. 154(b) by 156 days.

(21) Appl. No.: 13/047,904

(22) Filed: Mar. 15, 2011

(65) Prior Publication Data
US 2012/0239630 A1    Sep. 20, 2012

(51) Int. Cl.
*G06F 17/00* (2006.01)
(52) U.S. Cl.
USPC .......................................... 707/692; 707/687
(58) Field of Classification Search
USPC .......................................................... 707/692
See application file for complete search history.

(56) References Cited

U.S. PATENT DOCUMENTS

| 8,099,605 | B1* | 1/2012 | Billsrom et al. | 713/187 |
| 2006/0039196 | A1* | 2/2006 | Gorobets et al. | 365/185.01 |
| 2012/0109894 | A1* | 5/2012 | Kishi | 707/640 |

* cited by examiner

*Primary Examiner* — Neveen Abel Jalil
*Assistant Examiner* — Jagdish Pandya

(57) ABSTRACT

Example methods, and apparatus concern file repair. One example method includes storing a file in a file store and also parsing the file into a set of constituent data blocks. The method includes selectively storing, in a data store, unique data blocks from the set of constituent data blocks. The method includes maintaining, in a combination of the file store and the data store, a threshold number of copies of data blocks. The method also includes maintaining a data structure that stores data for locating the file in the file store and that stores data for recreating the file from data blocks. The method also includes maintaining a data structure that stores data for locating multiple copies of data found in members of the set of constituent data blocks. Files can be repaired using data blocks parsed from stored files or using data blocks stored as data blocks.

31 Claims, 8 Drawing Sheets

FILE REPAIR

BACKGROUND

Conventionally, it may have been desirable to store as much data as possible on tape for reasons including, but not limited to, high capacity, low cost, low power consumption, and long term retention. One challenge with storing large amounts of data on tape for long periods of time is the ability to read the data back reliably. Handling the media, environmental conditions, wear of tape drives and the media, or other factors may contribute to errors while reading the data. Even though the resiliency of the drives and media may be sufficient to overcome and recover from many types of errors using, for example, error correction codes and retries, some types of errors may result in unrecoverable read errors.

Losing data can be expensive, time-consuming, and very annoying. Therefore, data storage systems may store data in different locations on different devices in different ways to reduce the risk of losing data. For example, copies of files may be mirrored on multiple devices or may be distributed across redundant collections of devices. Data storage systems may also provide techniques to recreate lost data in the unfortunate event that data is lost. For example, if a file cannot be read from a first tape, then a copy of the file may be read from a second tape.

One conventional system that facilitates recreating data lost due to an unrecoverable read error may simply store a threshold number of copies of data in multiple locations. If one copy is lost, a backup copy may be used. However, conventional approaches like this may end up storing more copies than are necessary and may place undesirable constraints on tape homogeneity. With ever increasing data storage demands, storing more copies than are necessary to facilitate recovery may be undesirable and expensive. Additionally, when the data storage system is tape-based, the conventional approaches may place undesired constraints on the mirroring tape systems. For example, multiple tapes and multiple tape drives having similar or even identical sizes, performance, and other attributes may be required.

Prior art FIG. 1 illustrates a conventional system 100 for archiving files. While files are illustrated, more generally system 100 could archive data. System 100 stores files on different types of media including a set 110 of disks (e.g., disk 112, disk 114, . . . disk 118) and a set 120 of removable media storage (e.g., tape 122, tape 124, . . . tape 128). System 100 may interact with a different number of disks, may interact with different types of disks (e.g., platter, solid state), and may arrange the disks in different configurations. Similarly, system 100 may interact with a different number of tapes, may interact with different types of tapes, and may interact with different configurations of tapes.

System 100 may receive data 130 (e.g., file 132, file 134, object 136) to be archived or otherwise stored. System 100 may manage data 130 as part of maintaining a file system 150. An archive application 140 controls a backend storage manager 160 to store the data 130 on a member of the set 110 of disks or on a member of the set 120 of tapes. System 100 may store a file on both a disk and a tape to hopefully avoid losing data if one of the devices fails. For archiving, the data 130 would more likely be stored on tape while for near-lining or some other storage the data 130 would more likely be stored on disk. Some conventional systems may store every copy of a file that is received while other conventional systems may only store a single copy of a file.

Prior art FIG. 2 illustrates a tape 122 experiencing an unrecoverable read error. System 100 may have tried and failed to read a file from tape 122. Traditional systems have attempted to account for unrecoverable read errors in different ways. In one conventional approach, if the copy on tape 122 is unreadable, then a copy on another device (e.g., disk 112) could be read, if available. If the second copy was on another tape (e.g., tape 124), then that tape may need to be mounted to be able to read the duplicate copy.

In another conventional approach, a RAID-like strategy for tapes may have been employed. RAID stands for redundant array of independent disks and uses multiple disks to store data in ways that facilitate retrieving or recreating the data even if one of the disks fails. RAIT stands for redundant array of independent tapes and can similarly use multiple tapes to store data in a way that facilitates retrieving or recreating the data even if one of the tapes fails. RAIT could include, for example, mirrored pairs of tapes (e.g., RAIT-1), parity-based sets using three or more tapes, and other configurations. Using RAIT, the unrecoverable read error illustrated in prior art FIG. 2 might be overcome if tapes adjacent to the failed tape were part of a RAIT set and contained information sufficient to overcome the lost data.

The foregoing statements are not intended to constitute an admission that any patent, publication or other information referred to herein is prior art with respect to this disclosure. Rather, these statements serve to present a general discussion of technology and associated issues in the technology.

BRIEF DESCRIPTION OF THE DRAWINGS

The accompanying drawings, which are incorporated in and constitute a part of the specification, illustrate various example systems, methods, and other example embodiments of various aspects of the invention. The illustrated element boundaries (e.g., boxes, groups of boxes, or other shapes) in the figures represent one example of the boundaries. In some examples one element can be designed as multiple elements or that multiple elements can be designed as one element. In some examples, an element shown as an internal component of another element can be implemented as an external component and vice versa. Furthermore, elements may not be drawn to scale.

Prior Art

Prior Art

DETAILED DESCRIPTION

Figure 1:
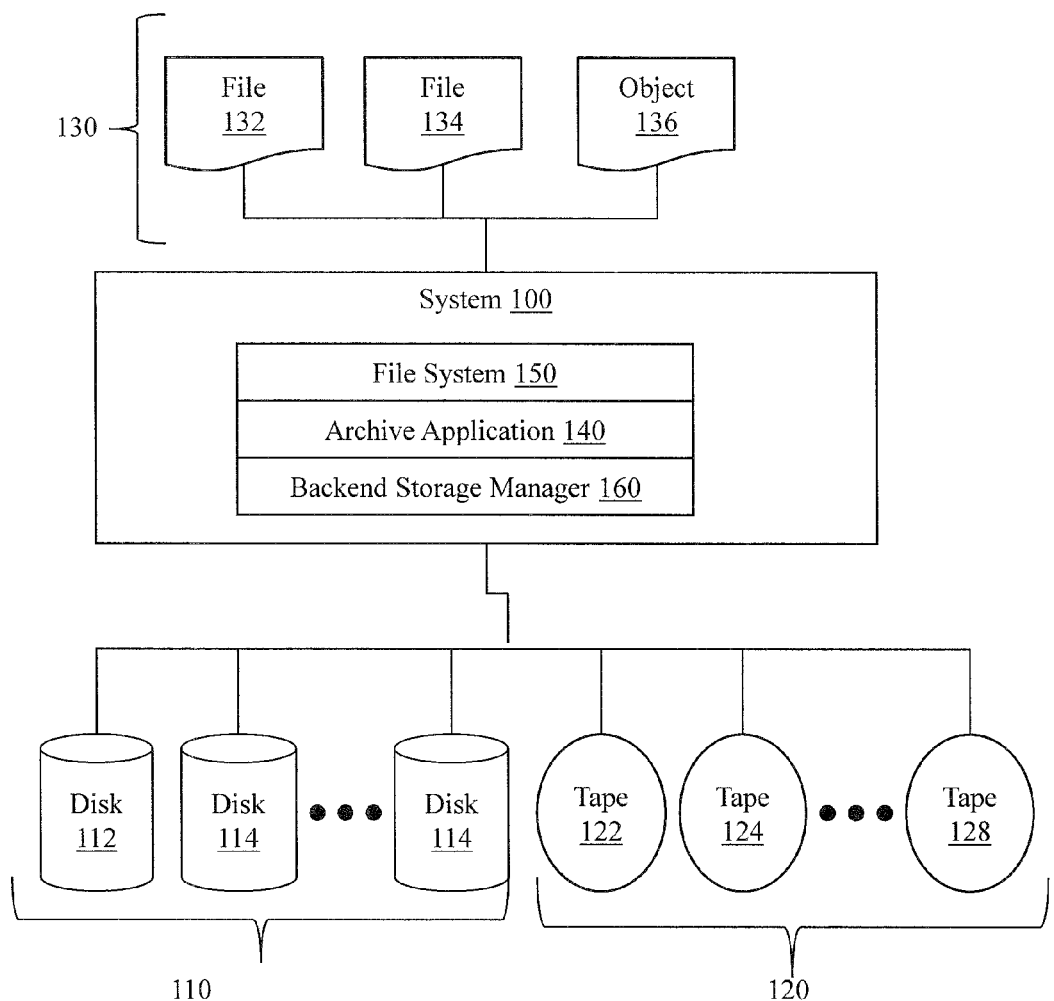
FIG. 1 illustrates a conventional system where files may be written to different types of media.
Figure 2:
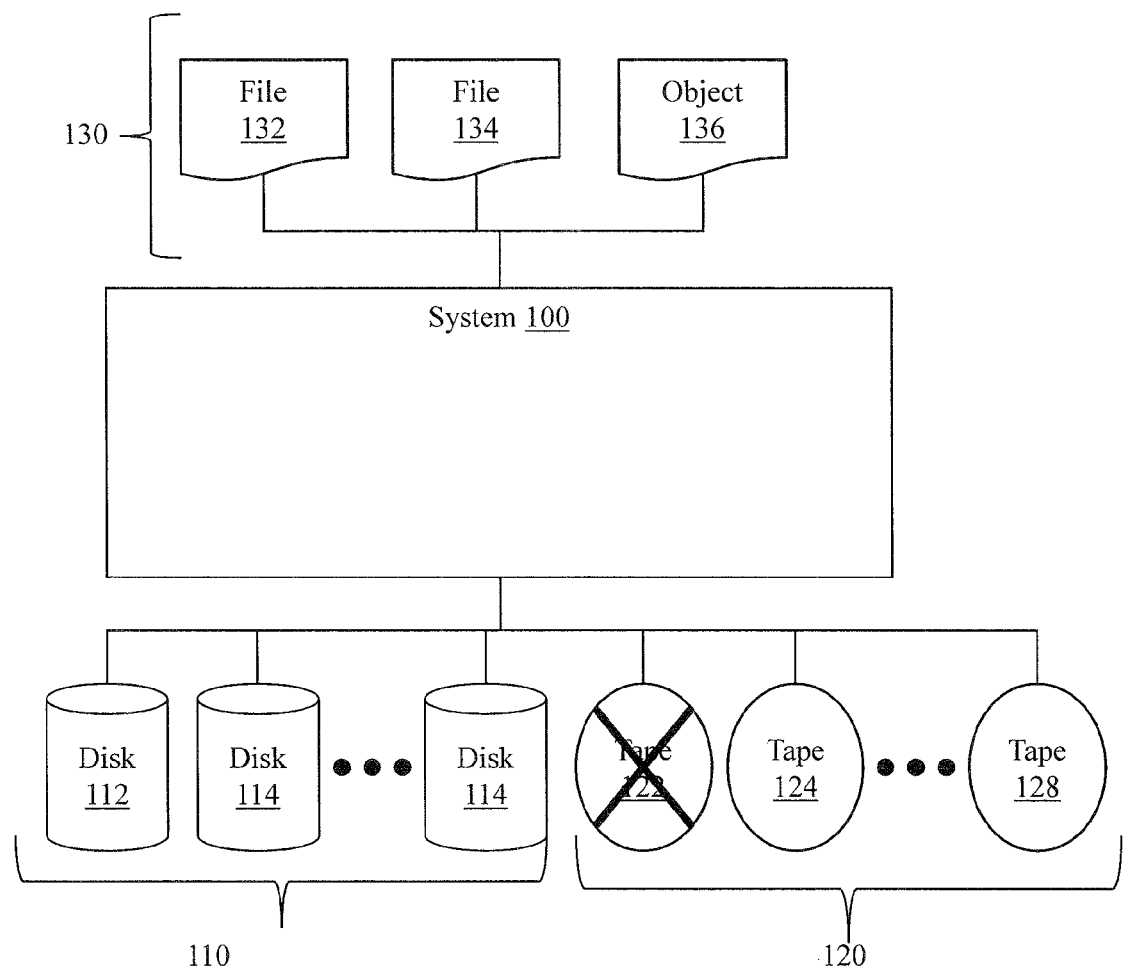
FIG. 2 illustrates the conventional system illustrated in prior art FIG. 1 experiencing a read error.

Example methods and apparatuses concern file repair. Example systems and methods facilitate recreating a file after an unrecoverable read error. Example systems and methods store up to a threshold number of copies of blocks of data that can be parsed from received files to facilitate recreating a damaged file. The blocks of data may be stored as blocks of data or may be stored in files written as complete files, not as collections of blocks. In one embodiment, file repair strategy is tuned to handle file repair issues that are more pronounced when the file being repaired and the location of at least some repair data is on removable media (e.g., tape).

In one embodiment, a received file is stored on tape in the form it was received. In addition to storing the file on tape, the file is chunked and hashed using data deduplication (dedupe) like techniques. Unique blocks may be stored in a dedupe-like repository and a dedupe-like recipe may be created for the received file. However, the file is not replaced by a file representation that includes pointers to the blocks. Instead, as mentioned above, the file is stored to tape. So then what is the point of performing the dedupe-like actions and making the recipe?

The point is that having a dedupe-like recipe available for a file facilitates recreating a portion of a file that is unavailable due, for example, to a read error. Instead of having to retrieve an entire duplicate copy of a file when a file read fails, only a portion of the file may need to be retrieved. Additionally, the portion may be retrieved from a location that is convenient at the time of the failure. For example, single blocks may be read from a repository of data blocks stored in a relatively fast access location (e.g., memory), a small number of blocks may be read from a relatively slower access location (e.g., disk), and a large number of blocks may be acquired by reading a portion of a duplicate file from a relatively slowest access location (e.g., un-mounted tape). Where a block(s) is read from may be selected from a collection of locations that are available.

A conventional dedupe system keeps one copy of a unique block and allows multiple files to be reconstituted using that stored block. Unique blocks are maintained solely in a repository of unique blocks. Example systems keep track of multiple copies of a unique block. The unique block may be stored as a block or may be stored as part of a larger item (e.g., file).

A conventional dedupe system maintains a single data structure that stores information for recreating a file from blocks stored in one location. Example systems maintain a data structure that stores information for recreating a file from blocks and/or files stored in multiple locations. Unlike conventional dedupe systems, unique blocks may be maintained in files that are stored in the form in which they were received. Select blocks may be parsed out of a stored file using a dedupe-like chunking approach.

Example systems and methods maintain a file data structure to track files, to maintain information about the identity of and order of unique blocks needed to recreate files, and to store information for locating a threshold number of repair copies of the unique blocks. In one embodiment, once a threshold number of repair copies are available on a threshold number of different storages, subsequently received blocks and/or files may not be stored.

Example systems and methods provide improved data reliability over conventional systems by relying on redundancies inherent to the data being stored. Example systems and methods also decouple from the available capacities of tapes being used. Therefore, example systems and methods may be more heterogeneous, using different media with different capacities and not requiring matched capacities in pairs or sets of tapes.

Example systems and methods employ dedupe techniques to facilitate repair. Dedupe uses well known techniques to reduce data storage. Some fundamental dedupe techniques include partitioning ingested data into blocks of potentially unique data and creating identifiers (e.g., hashes) for the blocks. The blocks may be fixed or variable length and become candidates for deduplication. The identifiers may be, for example, cryptographic hashes. The techniques also include creating "recipes" for recreating a data item (e.g., file) that has been decomposed into the smaller stored blocks. The recipes may include, for example, an ordered list of blocks of data found in the original data item, location information for the blocks of data, reference counts for the blocks of data, and so on. The techniques may also include creating and maintaining an index of the locations of unique blocks to facilitate locating unique blocks when required. The key to the index is typically the block identifier (e.g., hash).

Figure 3:
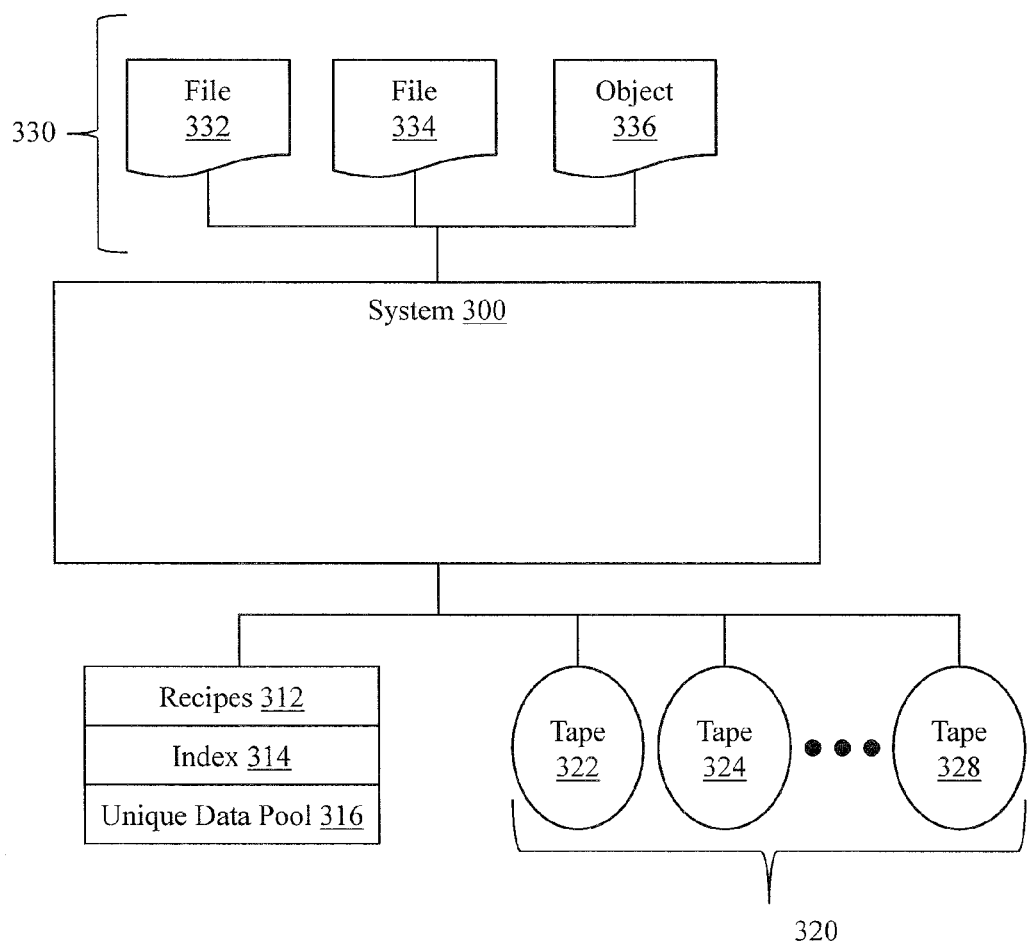
FIG. 3 illustrates an example file repair system.

FIG. 3 illustrates a system 300 that stores data in its original form on a member(s) of a set of tapes 320. System 300 also selectively stores data as a collection of unique blocks. System 300 may store more than one copy of a file and may also store more than one copy of a unique block to improve reliability. The number of copies of a file that are stored may be configurable. Similarly, the number of copies of a block of data that are stored may be configurable. In addition to writing a file to a tape (e.g., tape 322), system 300 may perform dedupe-like actions that produce a unique data pool 316 and an index 314 for accessing blocks in pool 316. System 300 may also perform the dedupe-like action of creating recipes 312 for files processed by system 300.

In FIG. 3, data 330 enters as, for example, files (e.g., 332, 334) or other objects (e.g., object 336). System 300 parses incoming data 300 into blocks that are then hashed to produce identifiers. The hashes may be, for example, cryptographically strong hashes familiar to those skilled in dedupe. An identifier for a file may be produced from the hashes. This identifier may be used to determine whether the system 300 already has access to a copy of the file. The individual hashes may be used by index 314 to determine whether the unique data pool 316 already has access to a copy of a block.

Unlike dedupe systems, system 300 does not replace the original file with pointers to or identifiers of unique data blocks. Instead, the recipe for the file is stored and the original file is selectively stored in the form it was received. The recipe for the file may be consulted when and if the file needs to be recreated after, for example, a read error.

In one embodiment, all files that system 300 processes are written to storage (e.g., tapes 320). In another embodiment, if system 300 determines that a threshold number of copies of a file are already stored on tapes 320, then the newly arrived copy may not be stored. In a single instancing system, only a single copy of a file is written to tapes 320. In a multi-instancing system, a threshold number (e.g., 3) of copies may be written to tapes 320. In addition to writing to tapes 320, blocks may be added to unique data pool 316. If copies of the blocks are not already stored by the system 300, then copies may be added to the unique data pool 316. However, if system 300 has already stored a threshold number of "repair copies", then system 300 may not add blocks to the unique data pool 316. Additionally, if a threshold number of repair copies are available, then copies may be removed from the unique data pool 316.

If system 300 already has access to a threshold number of repair copies, either on the tapes 320 or in the unique data pool 316, then the system 300 does not need to store any more copies. In one embodiment, the system 300 may retain a copy of the first occurrence of a unique data block as a data block in the unique data pool 316 until that block appears again in normal data. The system 300 may then decide to remove its own copy of the unique block from the unique data pool 316.

In one embodiment, the number of repair copies that system 300 maintains may be controlled by a policy. A policy may stipulate, for example, that N copies may be stored, or that N copies per M occurrences/references be stored for more frequently used data blocks. N and M may be, for example, controllable, user configurable, dynamically configurable, dynamically configurable in response to changing conditions, and so on. N and M are integers.

In one example the unique data pool 316 may be maintained on tape and not stored on disk. Tape storage may be suitable since the unique data should only be retrieved for repair purposes, which hopefully is infrequent. System 300 may store the unique data pool 316 on system tapes while files stored in their original form are stored on non-system tapes. While system tape is described, in different embodiments the unique set of data may be stored in other locations including, for example, disk, solid state drive, memory, and so on.

Example systems and methods maintain a data structure entry for a file that resembles the data structure entry used in dedupe systems. A data structure entry may be identified by its hash, which may be computed as a function of the hashes of its constituent data blocks. The data structure includes a recipe of blocks necessary for recreating the file. The data structure also includes information for locating a threshold number of copies of a block in the file. Instead of storing a single pointer to a single block in the unique data pool 316, the data structure stores information for locating multiple repair copies of a unique block. In one embodiment, the data structure includes pointers to up to p copies of the data block, where p is >=2. In one embodiment, p is controlled by a policy. In one embodiment, the pointer fully identifies the location of the block. The full identification may include, for example, identifying whether the block is on disk or on tape. If the block is on tape, then the full identification includes the volume, logical block address, starting offset and length for the block.

One example system may replace pointers in the data structure entry if superior repair blocks are available. For example, pointers to older blocks may be replaced with pointers to newer blocks, pointers to blocks stored on more expensive devices may be replaced with pointers to blocks stored on less expensive devices, pointers to blocks stored on slower devices may be replaced with pointers to blocks stored on faster devices, and so on. In one example, pointers to blocks located on the same device (e.g., drive) or media (e.g., tape) as another repair copy may be replaced with a pointer to a block on a different device to achieve storage location diversity. While pointers are described, one skilled in the art will appreciate that the data structure entry may store other information for locating blocks.

Example systems and methods rely on the file data structure to retrieve repair copies of blocks needed to fill in a gap caused by a read error. The repair copies that are retrieved may be selected to satisfy criteria that facilitate improving retrieval. For example, a block may be selected because it is located on a tape that is already mounted, because it is located on a tape that includes a large number of other blocks needed for repair, because it is located on the device or media that can be read fastest, because it is located on the device or media that can be read least expensively, because it is located on the device or media that can be read most securely or reliably, and so on.

Figure 4:
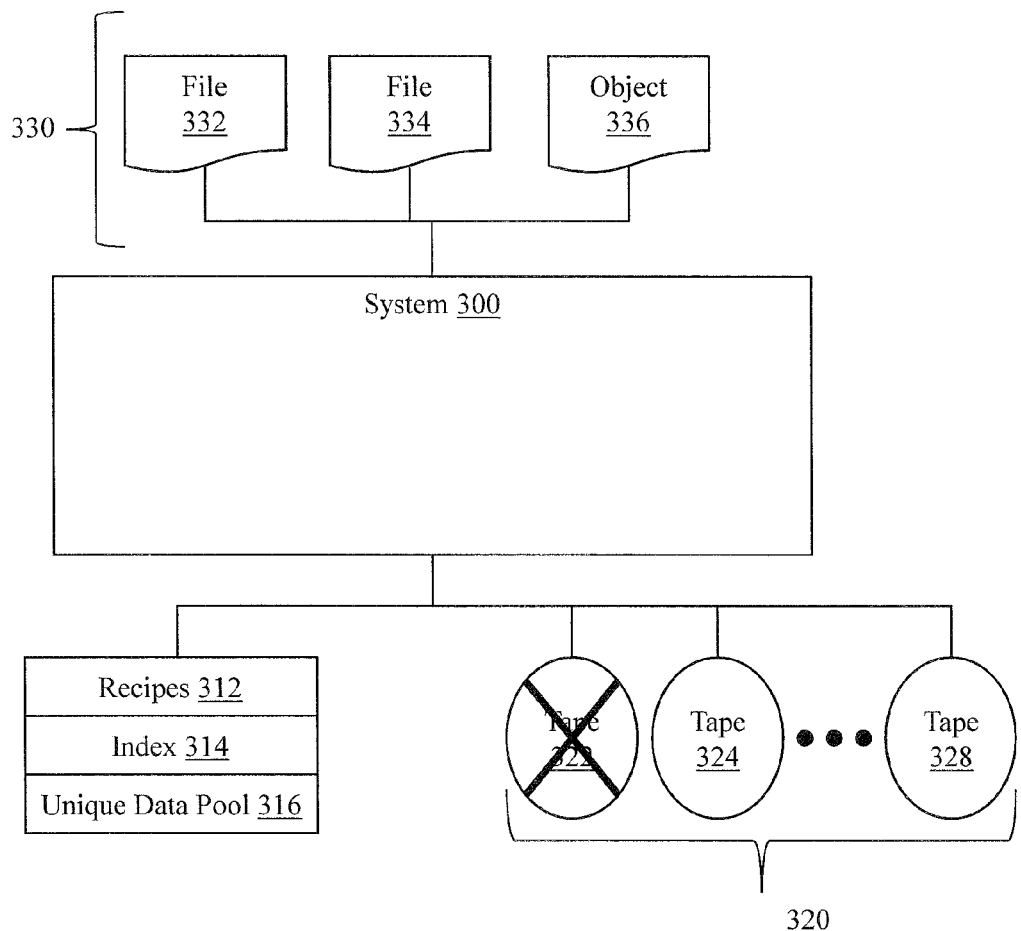
FIG. 4 illustrates an example file repair system experiencing a read error.

When a read error occurs, there may be one or more blocks that cannot be read. FIG. 4 illustrates tape 322 experiencing a read error. A conventional system would likely try to find another copy of the file on tapes 324 . . . 328. If another copy was found, then the entire other copy may be read. Example systems and methods take a different approach.

Upon detecting the read error, system 300 can identify data missing from the file by parsing the portion of the file that was read using the same dedupe-like technique that was used to parse the file when it was received by system 300. Then, using information about what blocks were successfully read and what blocks were not successfully read, and by using information about the file that is available in the recipes 312, system 300 may retrieve missing data blocks from either another file stored in the tapes 320 or from the unique data pool 316. Retrieving a block from the unique data pool 316 may require reading less data and therefore may take less time than a conventional system that locates and reads an entire separate copy of the misread file. Retrieving a block from another copy of a file stored on a different tape may also require reading less data and therefore may take less time than a conventional system that locates and reads an entire separate copy.

Having repaired the misread file, system 300 may then perform some housekeeping to prevent future errors. For example, the file that experienced the read error may have had blocks of data that could have been relied upon by system 300 to repair another file. Therefore, system 300 will update information that would lead to these now unavailable blocks. For example, if a block in the portion of the file that experienced the read error was in a list of repair blocks, then this block may be removed from the list of repair blocks because the block is no longer available as evidenced by the read error. Additionally, readable data may be migrated from tape 322 to another location to prevent further complications associated with reading tape 322.

Figure 5:
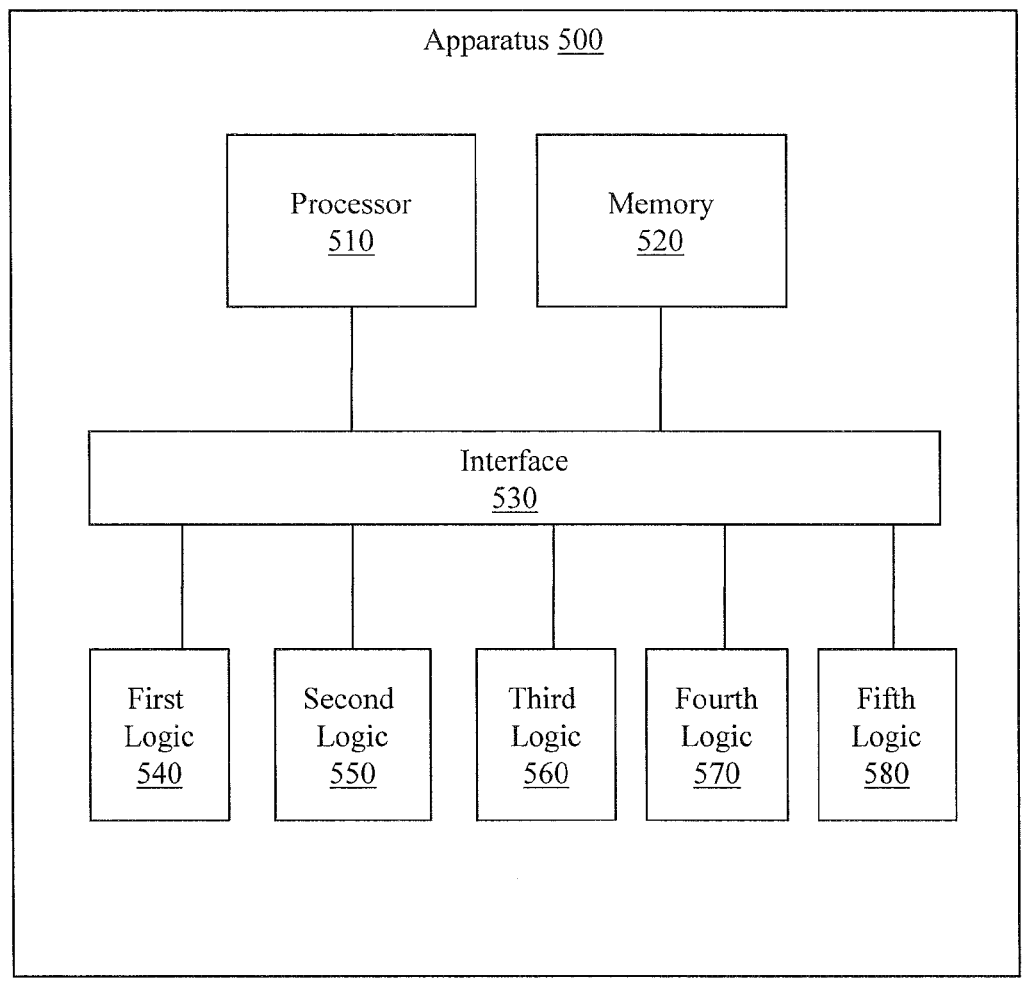
FIG. 5 illustrates an apparatus configured to perform file repair.

FIG. 5 illustrates an apparatus 500 configured to perform file repair. Apparatus 500 includes a processor 510, a memory 520, a set of logics, and an interface 530 configured to connect the processor 510, the memory 520, and the set of logics. In one embodiment the set of logics includes a first logic 540, a second logic 550, a third logic 560, and a fourth logic 570.

In one embodiment, the first logic 540 is configured to partition a file into a plurality of blocks. The file may be partitioned using dedupe-like techniques where fixed and/or variable sized blocks are produced. The first logic 540 may also be configured to compute hashes corresponding to the blocks. The hashes may be, for example, strong cryptographic hashes. The first logic 540 may also be configured to compute a file identifier for the file based on the plurality of hashes. The file identifier may be, for example, a hash computed from the hashes of blocks found in the file.

In one embodiment, the second logic 550 may be configured to selectively store the file in a file store. The file store may include removable media (e.g., tapes). The file may be stored upon determining that the file store has less than a first threshold number of instances of the file. If the file is stored, then second logic 550 will selectively update an entry for the file in a file data structure. The entry stores information about the file and stores information for locating repair blocks associated with the file.

The information stored for a file may include, for example, a file identifier, file metadata, a device identifier, a disk identifier, a disk location, a tape identifier, a volume identifier, a logical block address, a starting offset, a length, and an ordered list of blocks that make up the file. The information in the file data structure for locating repair blocks associated with the file may include information for locating up to the second threshold number of instances of a repair block.

In one example, the second logic 550 is configured to write the file to a selected member of the file store upon determining that an additional instance of the file is stored in the file store. The second logic 550 may decide to write the file to a different member of the file store than the member on which the additional instance of the file is stored. The second logic 550 may also decide where to write a file based on which tape(s), if any, are currently mounted in the file store. In one example, where speed may be more important than location diversity, the second logic 550 may write the file to a mounted tape. In another example, where location diversity may be more important than speed, the second logic 550 may write the file to an un-mounted tape that does not have any other copies of the file being written.

Since a file identifier is computed for the file being written, the second logic 550 may be able to determine whether there is another instance of the file or whether there are a threshold number of other instances already available to apparatus 500. In one example, if there are a threshold number of copies of the file already available to apparatus 500, then second logic 550 may compress the file before writing it, or may choose to not write the file at all.

In one embodiment, the second logic 550 bases the decision to write, to compress, or to not write on a dynamically configurable threshold. In different examples the threshold may be configured by a user and/or process in response to conditions including, how frequently the file is being accessed, how important the file is, how much storage is available, and so on. In one example, a user may simply configure the threshold based on their ideas concerning how many copies are enough copies and how many copies are too many copies.

In one embodiment, third logic 560 is configured to selectively manipulate a repository of repair blocks that can be used to recreate a misread file. Third logic 560 is configured to manipulate the repository upon determining that a block partitioned out of the file is a repair block for which an update action is to be performed. Which update action to perform is identified by determining how many instances of the repair block are available to the apparatus 500 collectively in the file store and the repository of repair blocks. In different examples, the repository of data blocks may be stored on disk, may be stored on tape, or may be stored on other devices.

In different embodiments, the third logic 560 can take different actions with respect to the repair block. For example, if the apparatus 500 has access to less than a desired number of copies of the repair block, then the third logic 560 may selectively add the repair block to the repository of repair blocks. The copies available may be computed from copies available in the file store and the repository of repair blocks collectively. If the apparatus 500 has access to more than enough copies of the repair block, then third logic 560 may selectively remove the repair block from the repository of repair blocks.

Fourth logic 570 is configured to selectively update information for locating instances of repair blocks. The information may facilitate locating repair blocks in the repository of repair blocks and/or in the file store. Fourth logic 570 will update the information for locating instances of repair blocks after comparing the location information for the repair block to location information for other instances of the repair block. Thus, fourth logic 570 may replace information if a more optimal repair environment can be created by replacing pointers or other block locating information. The fourth logic 570 may add information for finding a repair block, may remove information for finding a repair block, and may replace current information with "superior" information. The fourth logic 570 is configured to selectively replace the information upon determining that the repair block is a superior block with respect to attributes including, but not limited to, access time, age, access cost, access security, accessibility, and location diversity.

In one embodiment, the information for locating instances of repair blocks is stored in a data structure associated with the repair blocks. But in another embodiment, the information for locating instances of repair blocks is stored in the file data structure. Storing the information for locating multiple copies of a repair block in the data structure associated with a file allows the blocks to be retrieved by only accessing the file data structure. Storing information for locating multiple copies of a repair block in the data structure associated with the repair blocks reduces the number of pointers maintained by apparatus 500.

In one embodiment, apparatus 500 may also include a fifth logic 580. Fifth logic 580 is configured to detect a read error of a file being read from the file store. Fifth logic 580 may also be configured to selectively repair the file being read from the file store using repair blocks stored in the file store and/or the repository of repair blocks. Repairing the file may include identifying blocks read correctly, identifying blocks read incorrectly, and replacing blocks read incorrectly with selected repair blocks. Repair blocks may be selected to replace blocks read incorrectly as a function of attributes including, but not limited to, individual repair block read cost, individual repair block read time, individual repair block read security, aggregate repair block read cost, aggregate repair block read time, and aggregate repair block read security. For example, when more immediate file repair is required, the blocks that can be retrieved the fastest may be selected. However, when a less immediate but also less expensive file repair is desired, then blocks that are the least expensive to read may be selected.

After repairing the file, the fifth logic 580 may update information for locating the file. The fifth logic 580 may also make sure that pointers that pointed to blocks in the unreadable file are replaced with valid pointers or that information for locating blocks in the unreadable file is updated. Additionally, fifth logic 580 may migrate data from a medium that experienced a read error to another medium.

Figure 6:
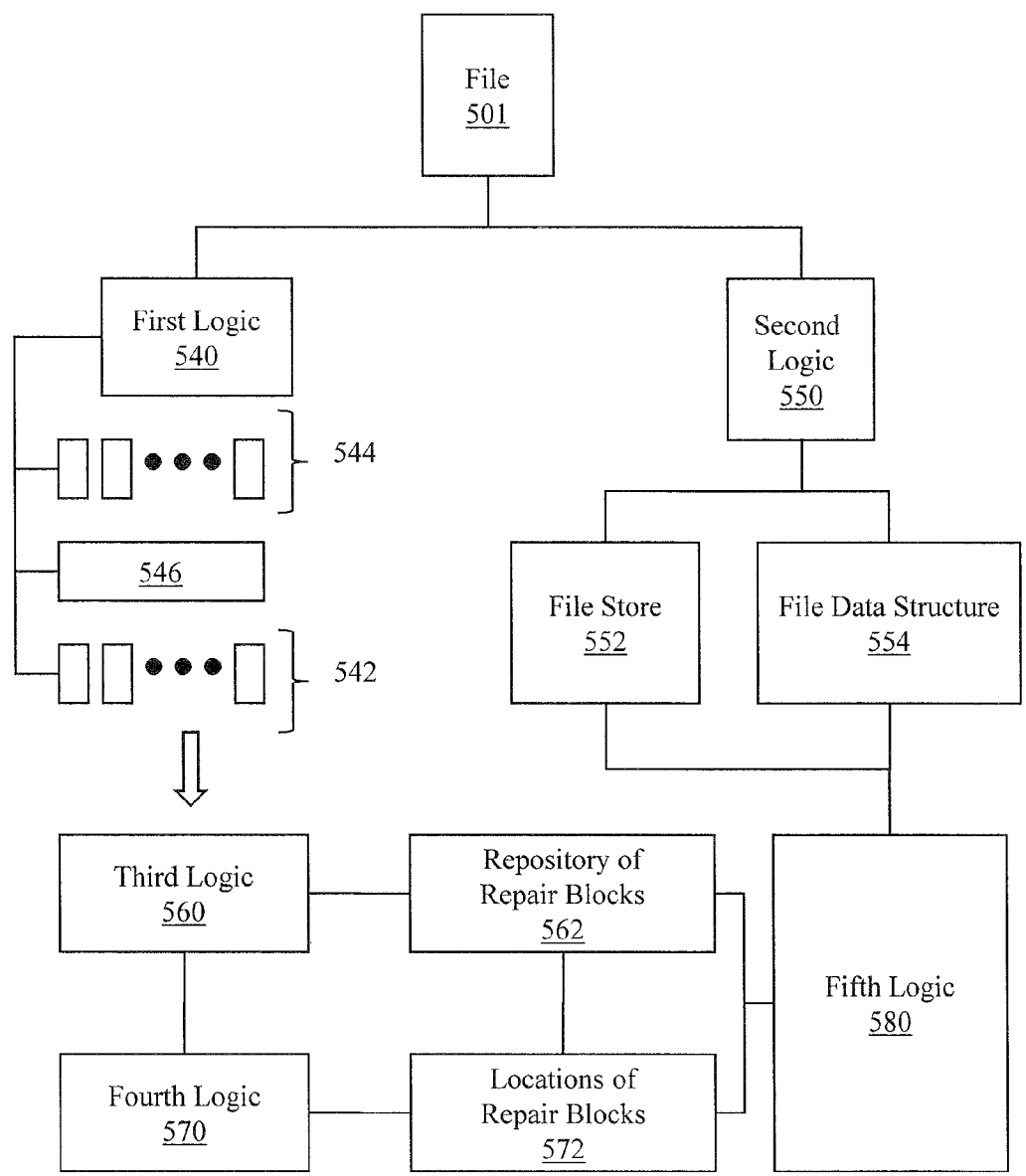
FIG. 6 illustrates logics and data structures used to perform file repair.

FIG. 6 illustrates logics and data structures used to perform file repair by the logics in apparatus 500 (FIG. 5). A file 501 may be provided to first logic 540 and to second logic 550. First logic 540 may parse blocks 544 from file 501, may compute hashes 542 for the blocks 544, and may compute a file identifier 546 for the file 501. Second logic 550 may store the file 501 in a file store 552 and may also update a file data structure 554 that stores information about files stored in file store 552. In different embodiments, first logic 540 and second logic 550 may operate in serial, partially in parallel, and/or wholly in parallel.

Third logic 560 may selectively write blocks selected from blocks 544 to a repository of repair blocks 562. Fourth logic 570 may maintain a data structure 572 that stores information concerning the locations of repair blocks in one or more of, the repository of repair blocks 562, and the file store 552. Fifth logic 580 is configured to repair files read incorrectly from the file store 552. Fifth logic 580 may use information from the data structures 572 and 554 and using data from repository 562 and file store 552.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, bytes, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, fewer than all the illustrated blocks may be required to implement an example methodology. Blocks may be combined or separated into multiple components. Furthermore, additional and/or alternative methodologies can employ additional, not illustrated blocks.

Figure 7:
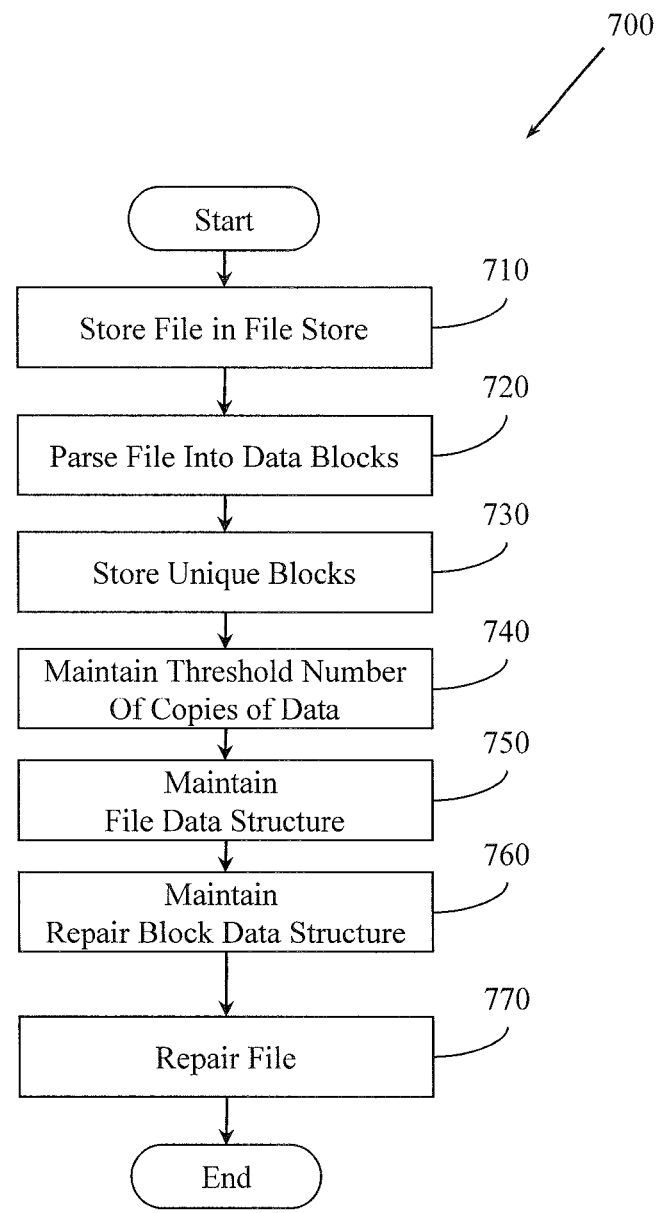
FIG. 7 illustrates a method for performing file repair.

FIG. 7 illustrates a method 700 for performing file repair. Method 700 includes, at 710, storing a file in a file store. In one embodiment, the file store includes one or more removable media. The removable media may be, for example, magnetic computer tapes. The tapes may be used to archive files.

Method 700 also includes, at 720, parsing the file into a set of constituent data blocks. In one example, parsing the file into a set of constituent data blocks includes controlling a data deduplication logic to perform chunking and hashing. One skilled in the art of data deduplication will appreciate that there are different approaches for parsing data blocks from a file.

Method 700 also includes, at 730, selectively storing, in a data store, unique data blocks from the set of constituent data blocks. The data store may be located on a tape(s).

Method 700 also includes, at 740, maintaining, in a combination of the file store and the data store, a threshold number of copies of data found in members of the set of constituent data blocks.

Method 700 also includes, at 750, maintaining a data structure that stores data for locating the file in the file store and that stores data for recreating the file from data blocks.

Method 700 also includes, at 760, maintaining a data structure that stores data for locating multiple copies of data found in members of the set of constituent data blocks. In one example, the data structure may be a single data structure that is file centric while in another example the data structure may be two data structures, one that is file-centric and one that is block-centric. The file-centric data structure may store information for recreating a file and for finding multiple copies of the blocks needed to recreate the file. The block-centric data structure may store information for finding multiple copies of blocks. When the block-centric data structure is used, the file-centric data structure may store information for accessing the block-centric data structure rather than storing information for directly locating multiple copies of a block.

In one example, maintaining a data structure that stores data for locating multiple copies of data found in members of the set of constituent data blocks comprises selectively adding information for locating a data block in one or more of, the data store, and the file store, selectively removing information for locating a data block in one or more of, the data store, and the file store, and selectively replacing information for locating one copy of a data block with information for locating a second, different copy of the data block.

Method 700 also includes, at 770, selectively repairing a file read from the file store using data retrieved from one or more of, the file store, and the data store. In one example, repairing the file read from the file store comprises adding repair blocks to data blocks correctly read from the file store, the repair blocks being additional data retrieved from one or more of, the file store, and the data store.

Figure 8:
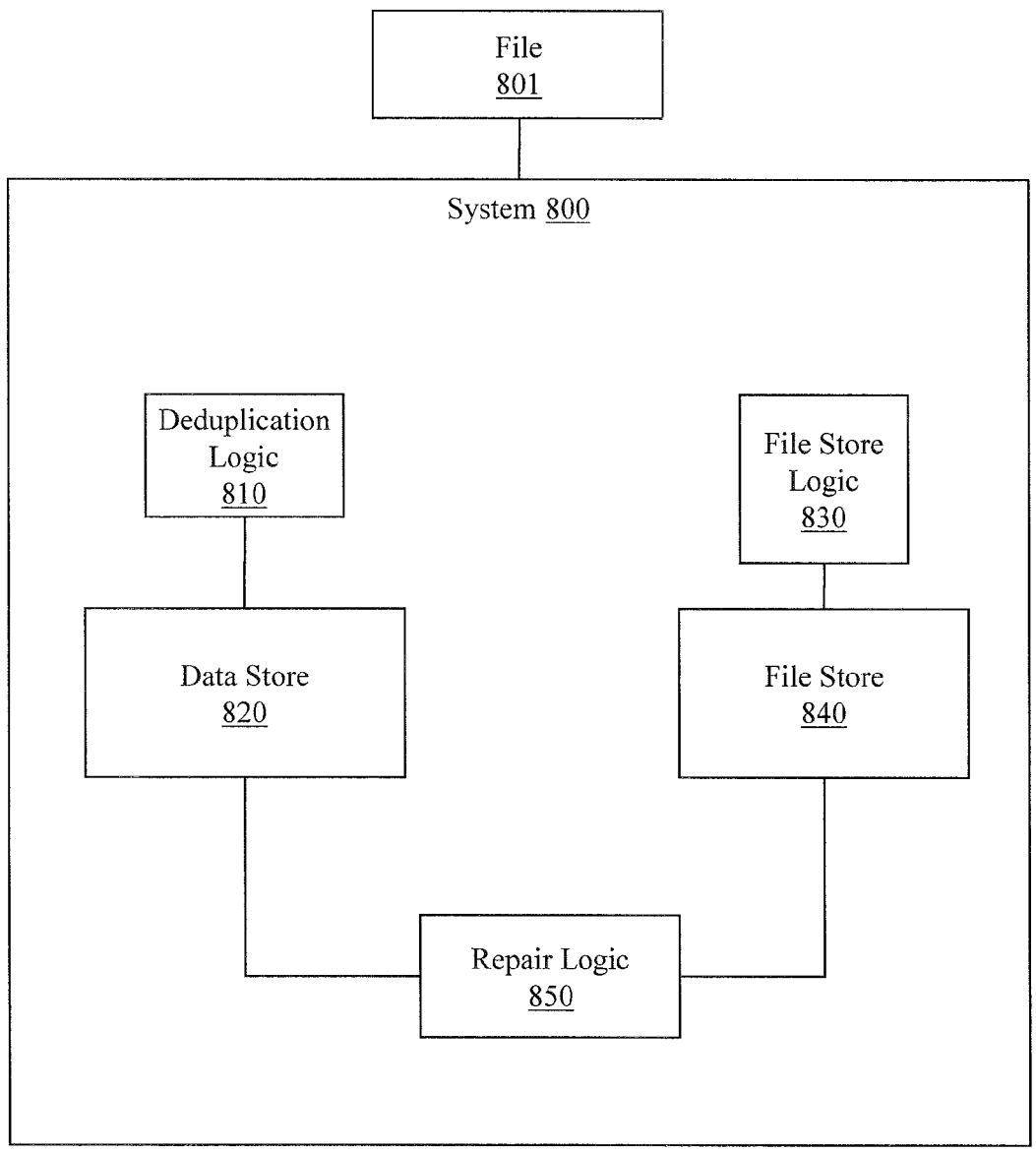
FIG. 8 illustrates a system for performing file repair.

FIG. 8 illustrates a system 800 for performing file repair. System 800 includes a deduplication logic 810 that is configured to parse blocks of data from a file 801 and to store the blocks of data parsed from the file 801 in a data store 820. The blocks may be parsed out of file 801 using techniques familiar to those skilled in data de-duplication.

System 800 also includes a file store logic 830 configured to store files in a file store 840. In one embodiment, the file 840 is a plurality of tapes and files are archived.

System 800 also includes a repair logic 850 that is configured to maintain information for locating at least a threshold number of instances of a data block in one or more of, the data store 820, and the file store 840. The repair logic 850 is also configured to repair a file read from the file store 840 using data blocks retrieved from one or more of, the file store 840, and the data store 820 using data maintained by the repair logic 850.

In one embodiment, system 800 includes the data store 820. In another embodiment, system 800 includes the file store 840. In one embodiment, system 800 includes both the data store 820 and the file store 840.

The following includes definitions of selected terms employed herein. The definitions include various examples and/or forms of components that fall within the scope of a term and that may be used for implementation. The examples are not intended to be limiting. Both singular and plural forms of terms may be used within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), and analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B), the term "or" is intended to mean "A or B or both". The phrase "only A or B but not both" indicates that "only A or B but not both" is to be employed. Thus, use of the term "or" herein is the inclusive, and not the exclusive use. See, Bryan A. Garner, A Dictionary of Modern Legal Usage 624 (2d. Ed. 1995).

What is claimed is:

1. An apparatus, comprising:
   a processor,
   a memory,
   a set of logics, and
   an interface configured to connect the processor, the memory, and the set of logics, the set of logics comprising:
   a first logic configured to partition a file into a plurality of blocks, to compute a plurality of hashes corresponding to the plurality of blocks, and to compute a file identifier for the file based on the plurality of hashes;
   a second logic configured to selectively store the file in a file store upon determining that the file store has less than a first threshold number of instances of the file and to selectively update an entry for the file in a file data structure, where the entry stores information about the file and stores information for locating repair blocks associated with the file;
   a third logic configured to selectively manipulate a repository of repair blocks upon determining that a member of the plurality of blocks is a repair block for which an update action is to be performed, where the update action is identified as a function of determining how many instances of the repair block are available to the apparatus in the file store and the repository of repair blocks collectively; and
   a fourth logic configured to selectively update information for locating instances of repair blocks in one or more of, the repository of repair blocks, and the file store, where the information for locating instances of repair blocks is updated as a function of comparing the location information for the repair block to location information for other instances of the repair block located in one or more of, the file store, and the repository of repair blocks,
   where the first threshold number is greater than one, and
   where the second logic is configured to selectively compress the file before writing the file to the file store upon determining that the file store already stores a second threshold number of instances of the file.

2. The apparatus of claim 1, the file store comprising at least one removable media.

3. The apparatus of claim 1, the second logic being configured to write the file to a selected member of the file store upon determining that an additional instance of the file is stored in the file store, the selected member being a different member of the file store than the member on which the additional instance of the file is stored.

4. The apparatus of claim 1, the second logic being configured to write the file to a mounted tape in the file store.

5. The apparatus of claim 1, the first threshold number being one.

6. The apparatus of claim 1, the second threshold number being a dynamically configurable number.

7. The apparatus of claim 1, the third logic being configured to perform one or more of,
   selectively adding the repair block to the repository of repair blocks upon determining that the apparatus has access to less than a third threshold number of instances of the repair block in the file store and the repository of repair blocks collectively, and
   selectively removing the repair block from the repository of repair blocks upon determining that the apparatus has access to at least the third threshold number of instances of the repair block in the file store and the repository of repair blocks collectively.

8. The apparatus of claim 7, the repository of repair blocks residing in the file store.

9. The apparatus of claim 7, the repository of repair blocks residing in the memory.

10. The apparatus of claim 1, the fourth logic being configured to perform one or more of
    adding information for locating the repair block to the information for locating instances of repair blocks;
    removing information for locating the repair block from the information for locating instances of repair blocks; and
    replacing information for locating a different instance of the repair block with information for locating the repair block.

11. The apparatus of claim 10, where the fourth logic is configured to selectively replace the information for locating the different instance of the repair block with information for locating the repair block upon determining that the repair block is a superior block with respect to one or more of, access time, age, access cost, access security, accessibility, and location diversity.

12. The apparatus of claim 1, where the information for locating instances of repair blocks is stored in a data structure associated with the repair blocks.

13. The apparatus of claim 1, where the information for locating instances of repair blocks is stored in the file data structure.

14. The apparatus of claim 1, where the file identifier is a file hash and where the file data structure is indexed by the file hash.

15. The apparatus of claim 1, where the information about the file includes one or more of, a device identifier, a disk identifier, a disk location, a tape identifier, a volume identifier, a logical block address, a starting offset, a length, and an ordered list of blocks that make up the file.

16. The apparatus of claim 1, where the information in the file data structure for locating repair blocks associated with the file comprises information for locating up to the second threshold number of instances of a repair block.

17. The apparatus of claim 1, comprising a fifth logic configured to detect a read error of a file being read from the file store, and to selectively repair the file being read from the file store using repair blocks stored in one or more of, the file store, and the repository of repair blocks.

18. The apparatus of claim 17, where repairing the file comprises identifying blocks read correctly, identifying blocks read incorrectly, and replacing blocks read incorrectly with selected repair blocks.

19. The apparatus of claim 18, where the selected repair blocks are selected to replace blocks read incorrectly as a function of one or more of, individual repair block read cost, individual repair block read time, individual repair block read security, aggregate repair block read cost, aggregate repair block read time, and aggregate repair block read security.

20. The apparatus of claim 17, the fifth logic being configured to selectively relocate a file stored in the file store from a first location in the file store to a second location in the file store upon determining that the read error was associated with the first location.

21. The apparatus of claim 17, the fifth logic being configured to selectively update the information for locating instances of repair blocks upon determining that location information for a repair block is incorrect as a result of one or more of, the read error, and repairing the file.

22. The apparatus of claim 17, the fifth logic being configured to selectively update the entry for the file in the file data structure upon determining that a value in the entry is incorrect as a result of repairing the file.

23. A non-transitory computer-readable medium storing computer-executable instructions that when executed by a computer control the computer to perform a method, the method comprising:
storing a file in a file store;
parsing the file into a set of constituent data blocks;
selectively storing, in a data store, unique data blocks from the set of constituent data blocks;
maintaining, in a combination of the file store and the data store, a threshold number of copies of data found in members of the set of constituent data blocks;
maintaining a data structure that stores data for locating the file in the file store and that stores data for recreating the file from data blocks; and
maintaining a data structure that stores data for locating multiple copies of data found in members of the set of constituent data blocks,
where the threshold number is greater than one, and
where the file is selectively compressed before storing the file in the file store upon determining that the file store already stores a second threshold number of instances of the file.

24. The non-transitory computer-readable medium of claim 23, the method comprising:
selectively repairing a file read from the file store using data retrieved from one or more of, the file store, and the data store.

25. The non-transitory computer-readable medium of claim 24, where repairing the file read from the file store comprises adding repair blocks to data blocks correctly read from the file store, the repair blocks being additional data retrieved from one or more of, the file store, and the data store.

26. The non-transitory computer-readable medium of claim 23, the file store comprising one or more removable media.

27. The non-transitory computer-readable medium of claim 23, where parsing the file into a set of constituent data blocks comprises controlling a data deduplication logic to perform chunking and hashing.

28. The non-transitory computer-readable medium of claim 23, the one or more data structures comprising a single data structure that is file centric.

29. The non-transitory computer-readable medium of claim 23, the one or more data structures comprising a first data structure that is file-centric and a second data structure that is block-centric.

30. The non-transitory computer-readable medium of claim 23, where maintaining a data structure that stores data for locating multiple copies of data found in members of the set of constituent data blocks comprises selectively adding information for locating a data block in one or more of, the data store, and the file store, selectively removing information for locating a data block in one or more of, the data store, and the file store, and selectively replacing information for locating one copy of a data block with information for locating a second, different copy of the data block.

31. A system, comprising:
a de-duplication logic configured to parse blocks of data from files and to store the blocks of data parsed from the files in a data store;
a file store logic configured to store files in a file store, the file store comprising a plurality of tapes; and
a repair logic configured to maintain information for locating at least a threshold number of instances of a data block in one or more of, the data store, and the file store, the repair logic also being configured to repair a file read from the file store using data blocks retrieved from one or more of, the file store, and the data store using data maintained by the repair data logic,
where the threshold number of instances is greater than one, and
where the file store logic is configured to selectively compress a file before storing the file in the file store upon determining that the file store already stores a second threshold number of instances of the file.

* * * * *